US012792004B2

(12) United States Patent
Uchiyama et al.

(10) Patent No.: US 12,792,004 B2
(45) Date of Patent: Nov. 10, 2026

(54) SUPPORT APPARATUS AND DESIGN SUPPORT METHOD

(71) Applicant: HITACHI, LTD., Tokyo (JP)

(72) Inventors: Yuya Uchiyama, Tokyo (JP); Yoichi Arima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 363 days.

(21) Appl. No.: 18/678,070

(22) Filed: May 30, 2024

(65) Prior Publication Data

US 2025/0036100 A1 Jan. 30, 2025

(30) Foreign Application Priority Data

Jul. 28, 2023 (JP) ................................ 2023-123719

(51) Int. Cl.
*G05B 19/408* (2006.01)
*G06F 40/289* (2020.01)

(52) U.S. Cl.
CPC .................... *G05B 19/4083* (2013.01); *G05B 2219/35066* (2013.01); *G06F 40/289* (2020.01)

(58) Field of Classification Search
None
See application file for complete search history.

(56) References Cited

U.S. PATENT DOCUMENTS

2008/0172379 A1* 7/2008 Uehara .................. G06F 16/56 707/999.005

FOREIGN PATENT DOCUMENTS

JP 2021131720 A 9/2021

* cited by examiner

*Primary Examiner* — Ryan A Jarrett
(74) *Attorney, Agent, or Firm* — MATTINGLY & MALUR, PC

(57) ABSTRACT

A design support apparatus includes: an input unit configured to acquire design information related to a target product; an extraction unit configured to extract, based on a classification axis that is a rule for classifying a phrase or a numerical value related to a component, a function, or a requirement specification in the target product and that is stored in a classification axis storage unit, the phrase or the numerical value related to the component, the function, or the requirement specification from the design information; a recognition unit configured to recognize a relationship between the extracted phrases or between the extracted numerical values related to the component, the function, or the requirement specification based on a content structure of the design information and a co-occurrence; an association unit configured to associate the relationship between the phrases or between the numerical values; and an output unit.

9 Claims, 10 Drawing Sheets

| PHRASE OR NUMERICAL VALUE | CLASSIFICATION |
|---|---|
| MOTOR | COMPONENT |
| GEAR | COMPONENT |
| TRANSMISSION | FUNCTION |
| DRIVE | FUNCTION |
| ** dB | REQUIREMENT SPECIFICATION |
| * W | REQUIREMENT SPECIFICATION |

SUPPORT APPARATUS AND DESIGN SUPPORT METHOD

CROSS-REFERENCE TO RELATED APPLICATIONS

The present invention relates to and asserts priority from Japanese patent application No. 2023-123719 filed on Jul. 28, 2023, and incorporates the entirety of the contents and subject matter of all the above application herein by reference.

BACKGROUND OF THE INVENTION

1. Field of the Invention

The present invention relates to a design support apparatus and a design support method.

2. Description of Related Art

In the design field of a product or an information system (hereinafter, referred to as a product), many works are done to create new design proposals by changing the design of a part of an existing product. However, in recent years, the product has become more complicated and multifunctional, and the components and specifications to be studied at the time of design change tend to increase. As a result of the enormous amount of work required for the study, it is difficult to grasp the entire product, and product defects occur due to omissions in the study.

To accurately grasp the influence of the design change, it is important to accurately understand the characteristics of a target design change part such as functions and requirement specifications. In addition, if an interrelationship between a structure, the function, or the requirement specification of the product can be grasped, it is possible to search for a part that requires the design change from functions or requirement specifications to be changed. Grasping the relationship between the structure, the function, or the requirement specification as described above contributes to the prevention of design errors due to the design change and the improvement of design efficiency.

Model-based systems engineering (MBSE) is used as a technique for providing an overview of the structure, the function, or the requirement specification of the product. The MBSE visualizes the natural language describing the product as a model (graphic), and visualizes the relationship between items included in each model, thereby improving the design efficiency and preventing the design error. However, when associating items including components, functions, and requirement specifications, there is a problem that the number of target items may be large, and the more complicated the relationships are, the more the number of work steps increases.

Concerning the above problem, PTL 1 exists as a technology for linking two pieces of natural language information with a link. A design support apparatus in PTL 1 executes natural language processing on input requirement specification information to extract words related to requirement specifications, and extracts related technique information based on the extracted words.

CITATION LIST

Patent Literature

PTL 1: JP-2021-131720A

SUMMARY OF THE INVENTION

To grasp a relationship between phrases or between numerical values related to a component, a function, or a requirement specification related to a complicated product, it is desirable to acquire a phrase or a numerical value related to a component, a function, or a requirement specification in a target product and automatically recognize a relationship between the acquired phrases or between the acquired numerical values related to the component, the function, or the requirement specification.

The design support apparatus in PTL 1 does not extract an item related to the component and the function from the requirement specification information. Therefore, it is not sufficient as a method for extracting a phrase or a numerical value related to a component, a function, or a requirement specification of a product.

An object of the invention is to automatically extract a phrase or a numerical value related to a component, a function, or a requirement specification related to a target product, recognize a relationship between the extracted phrases or the extracted numerical values related to the component, the function, or the requirement specification, and perform an association.

A design support apparatus according to the invention includes: an input unit configured to acquire design information related to a target product; an extraction unit configured to extract, based on a classification axis that is a rule for classifying a phrase and a numerical value related to a component, a function, or a requirement specification in the target product and is stored in a classification axis storage unit configured to store the classification axis, the phrase or the numerical value related to the component, the function, or the requirement specification from the design information; a recognition unit configured to recognize a relationship between the extracted phrase and the extracted numerical value related to the component, the function, or the requirement specification based on a content structure of the design information and a co-occurrence; an association unit configured to associate the relationship between the phrase and the numerical value; and an output unit configured to output a result of the association executed by the association unit.

Other means will be described in the embodiments for carrying out the invention.

According to the invention, it is possible to automatically extract a phrase or a numerical value related to a component, a function, or a requirement specification related to a target product, recognize a relationship between the extracted phrase and numerical value related to the component, the function, or the requirement specification, and perform an association. As a result, the invention presents the recognized relationship to the user, thereby supporting the overhead understanding of the product. Further, according to the invention, in the case of creating the MBSE model, various effects can be obtained, such as supporting the prevention of omission in the relational input between each phrase and numerical value.

DESCRIPTION OF EMBODIMENTS

Hereinafter, embodiments according to the invention will be described with reference to the drawings. Although the drawings show specific embodiments according to principles of the prevent invention, these embodiments are provided for understanding the prevent invention and are not to be used for limitedly interpreting the invention.

First Embodiment

Figure 1:
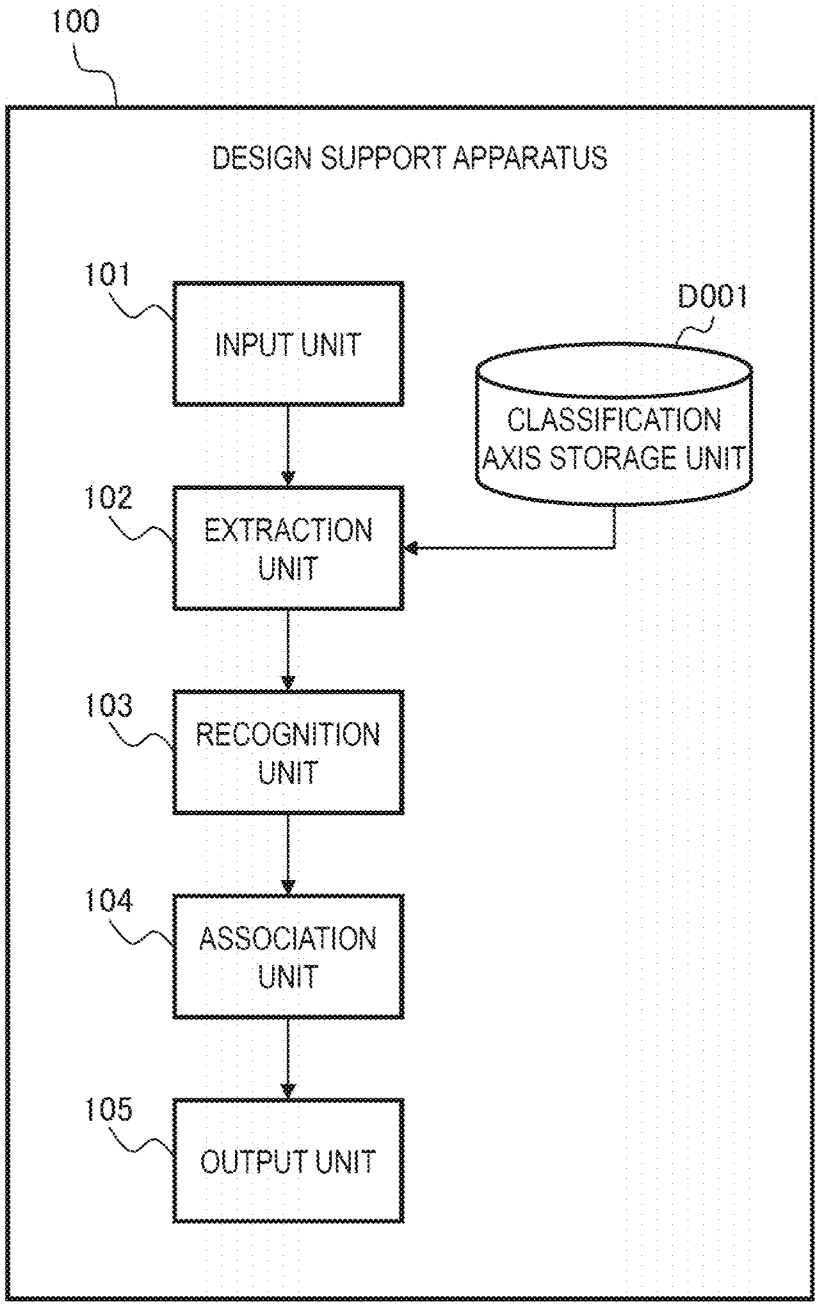
FIG. 1 is a block diagram showing a design support apparatus according to a first embodiment.

FIG. 1 is a block diagram of a design support apparatus 100 according to a first embodiment. The design support apparatus 100 includes an input unit 101, an extraction unit 102, a recognition unit 103, an association unit 104, an output unit 105, and a classification axis storage unit D001.

The input unit 101 acquires a plurality of pieces of design information related to a target product input by a user.

The extraction unit 102 acquires the phrase or the numerical value in a document of the design information acquired by the input unit 101 by natural language processing. Based on a classification axis stored in the classification axis storage unit D001, the extraction unit 102 classifies which of a component, a function, or a requirement specification of the target product the phrase or the numerical value corresponds to, and performs extraction. The natural language processing is a technique of processing a language described in a natural sentence by a machine to extract content and is used for a search engine, a prediction conversion, and the like. The classification axis storage unit D001 may not be a configuration of the design support apparatus 100 itself and may be present in any place such as in a cloud.

The recognition unit 103 recognizes a relationship between the classified and extracted phrase and numerical value based on a content structure of the document of the design information and a co-occurrence. Here, the content structure of the document is any structure for determining the dependency relationship between the phrase and the numerical value, such as a relationship between subjects and predicates, a relationship between modifiers and modified words, and a relationship between actions and objects of actions. The co-occurrence is a possibility (frequency) that two of the phrases or two of the numerical values appear simultaneously. That is, the recognition unit 103 recognizes a relationship between two of the phrases and two of the numerical values that frequently appear as a set. The "relationship between phrases and between the numerical values" is a concept including a "relationship between a phrase and another phrase" and a "relationship between a numerical value and another numerical value".

The association unit 104 associates the recognized relationships between the phrase or a numerical value. As a result, the association unit 104 associates the relationships between the phrase or a numerical value related to the component, the function, or the requirement specification.

The output unit 105 outputs the relationships between the phrase or a numerical value related to the component, the function, or the requirement specification which are associated by the association unit 104.

Figure 2A:
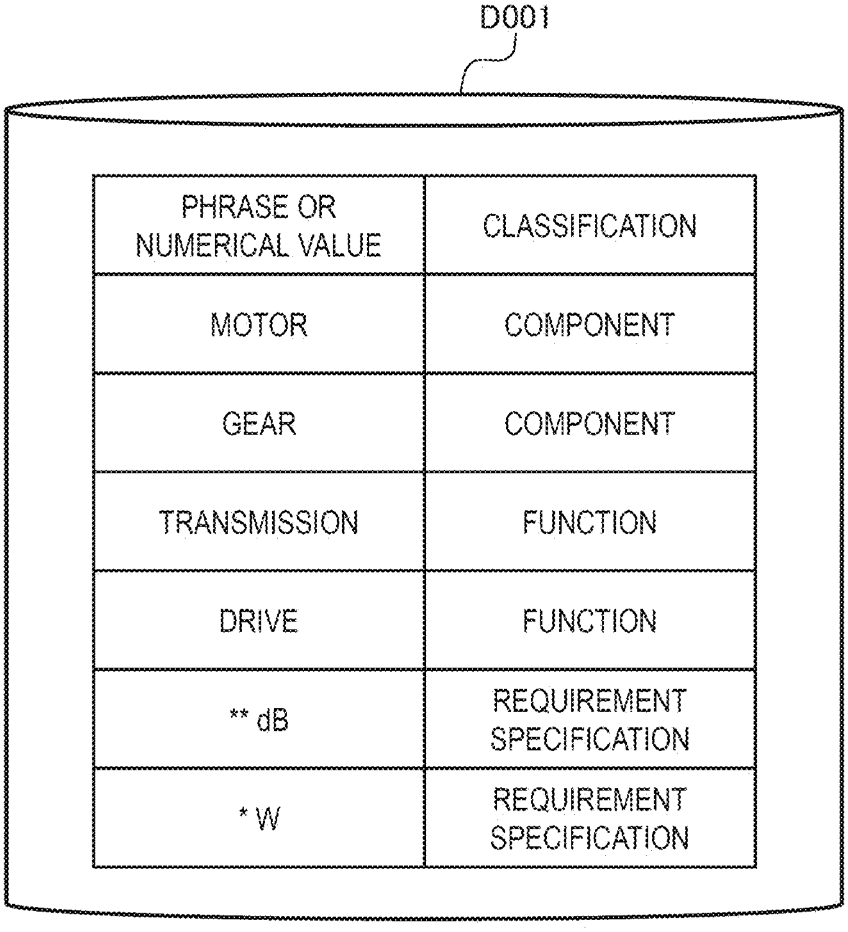
FIG. 2A is a diagram showing a classification axis.

FIG. 2A is a diagram showing a classification axis stored in the classification axis storage unit D001 according to the first embodiment. The classification axis according to the first embodiment is a classification rule that indicates which of the component, the function, or the requirement specification the phrase or a numerical value are classified. Here, the component indicates a name of a component constituting a product or a name of a unit that is an aggregate of components. The function indicates a feature of the product or a role of the product. The requirement specification indicates a specific index related to a characteristic and a function required for the product. A classification result (component, function, and requirement specification) may be referred to as an "item".

Figure 2B:
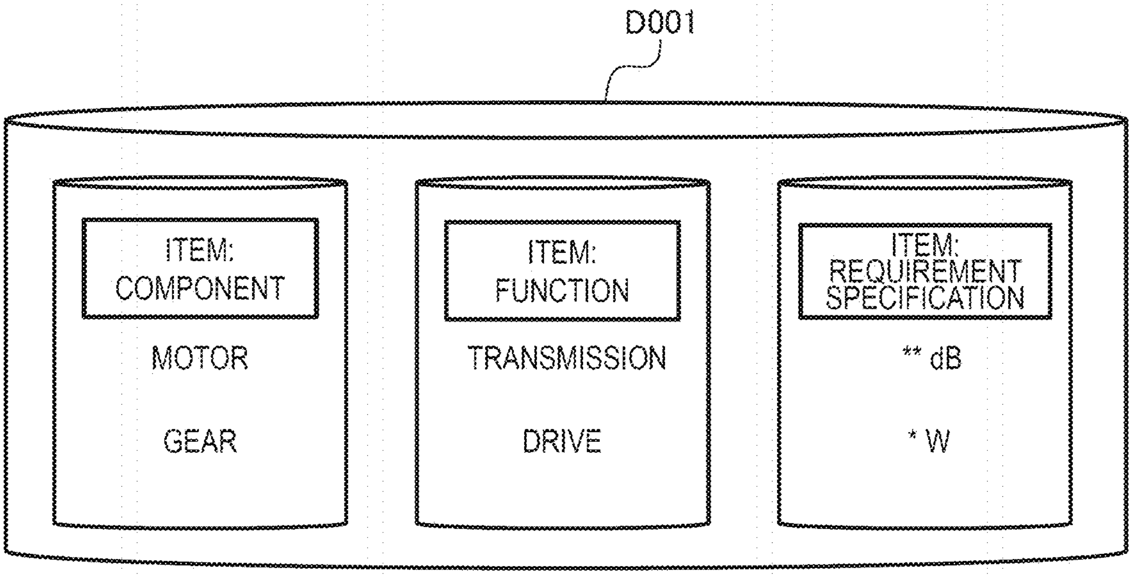
FIG. 2B is a diagram showing another example of the classification axis.

FIG. 2B is a diagram showing another example of the classification axis stored in the classification axis storage unit D001. The classification axis storage unit D001 may store the phrase or a numerical value for each item of component, the function, or the requirement specification.

Figure 3:
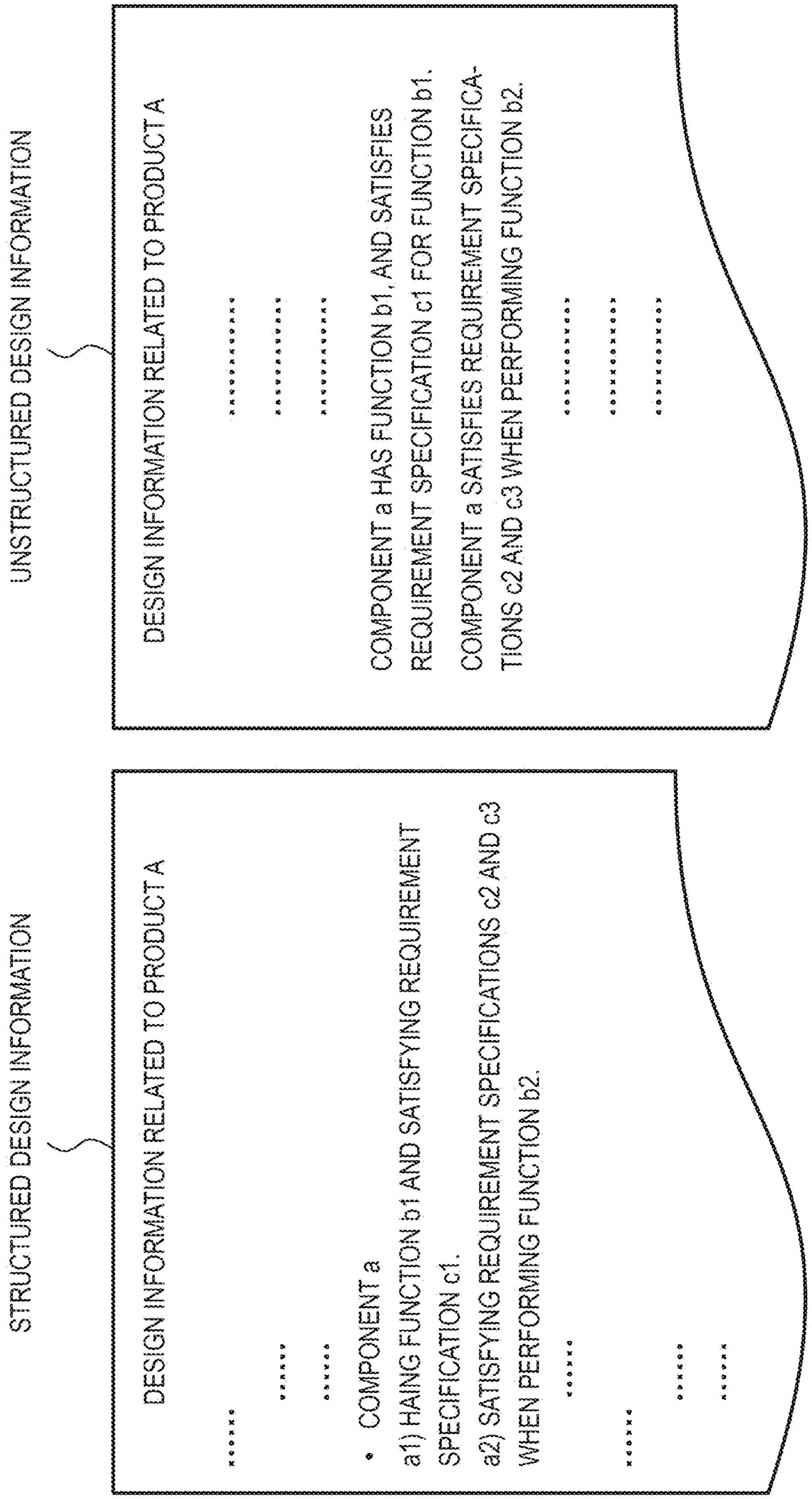
FIG. 3 is a diagram showing an example of design information.

FIG. 3 is a diagram showing an example of the design information. Design information related to a product A is described in a natural language. For example, for a component constituting the product A, the design information describes a function of the component and a requirement specification for performing the function. Examples of a method for describing the design information include a method (left diagram in FIG. 3) in which description contents are structured for each item of the component, the function, or the requirement specification and a method (right diagram in FIG. 3) in which description contents are described without structuring.

Figure 4:
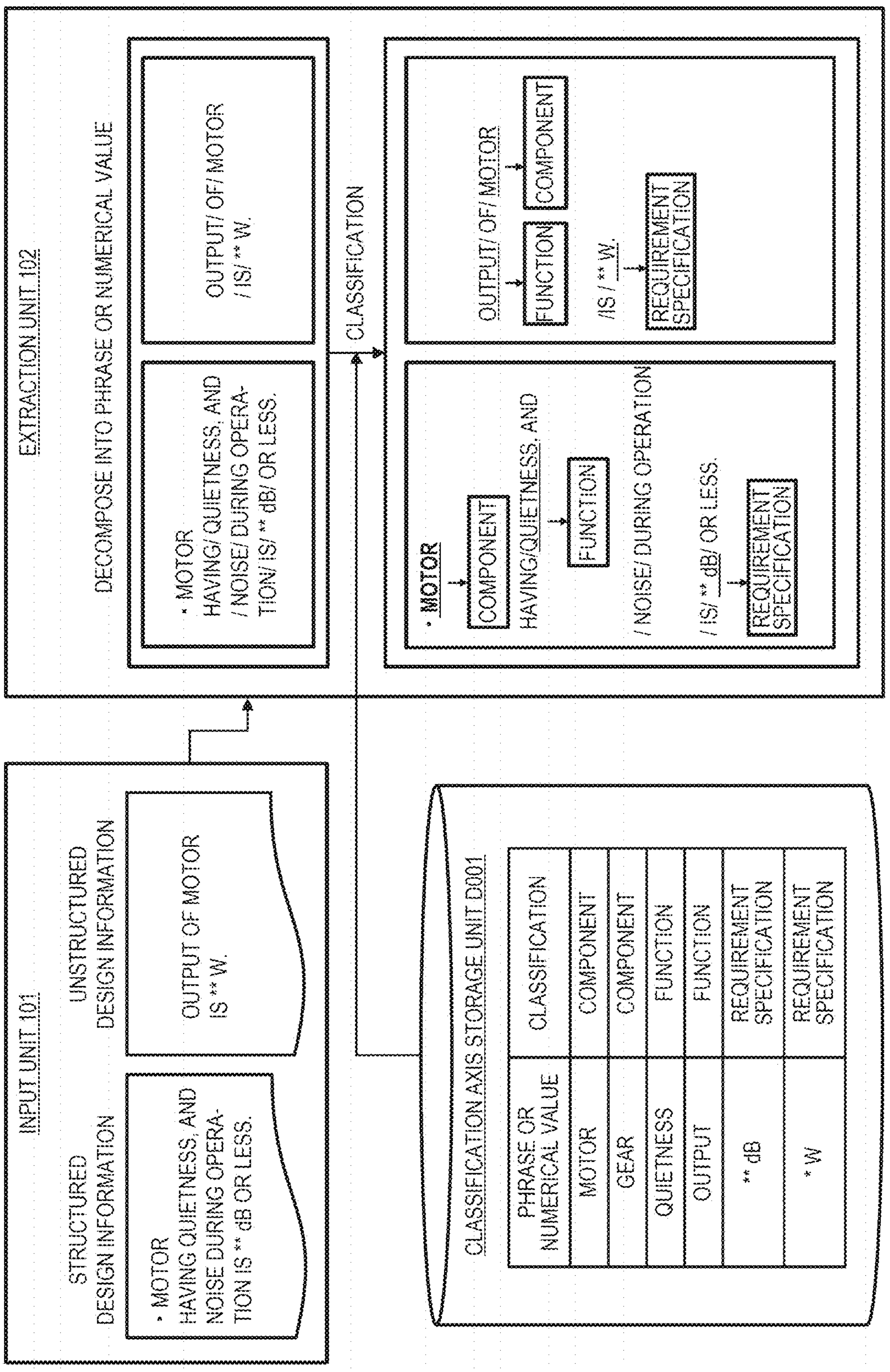
FIG. 4 is a diagram showing a processing procedure of an extraction unit.

FIG. 4 is a diagram showing a processing procedure of the extraction unit 102. The input unit 101 transfers the plurality of pieces of design information acquired by itself to the extraction unit 102. The extraction unit 102 extracts the phrase or a numerical value from the document included in the design information. To extract the phrase or a numerical value, the extraction unit 102 disassembles the document included in the design information into words from which the phrase or a numerical value can be extracted. To perform disassemble processing, the extraction unit 102 uses, for example, techniques such as a rule-based search method based on regular representation in a field of natural language processing, morphological analysis, and bidirectional encoder representations from transformers (BERT).

After disassembling the document included in the design information into units of phrase or a numerical value, the extraction unit 102 classifies each of the phrases or the numerical values based on the classification axis stored in the classification axis storage unit D001. The classification axis storage unit D001 stores the classification axis for defining which item of the component, the function, or the requirement specification the phrase or a numerical value are classified. The extraction unit 102 classifies the phrase or a numerical value based on the classification axis and assigns the classification result (item) to the phrase or a numerical value. When the design information is structured and described for each item of the component, the function, or the requirement specification, the extraction unit 102 performs extraction on items of the component, the function, or the requirement specification in an upper stage of an outline (hierarchical structure of paragraphs) of the structured document.

In addition, the extraction unit 102 may generate synonyms of the phrase or a numerical value stored in the classification axis storage unit D001 and classify the phrase or a numerical value in the design document together with the synonyms. The classification axis storage unit D001 may store a dictionary in which synonyms are learned.

Figure 5:
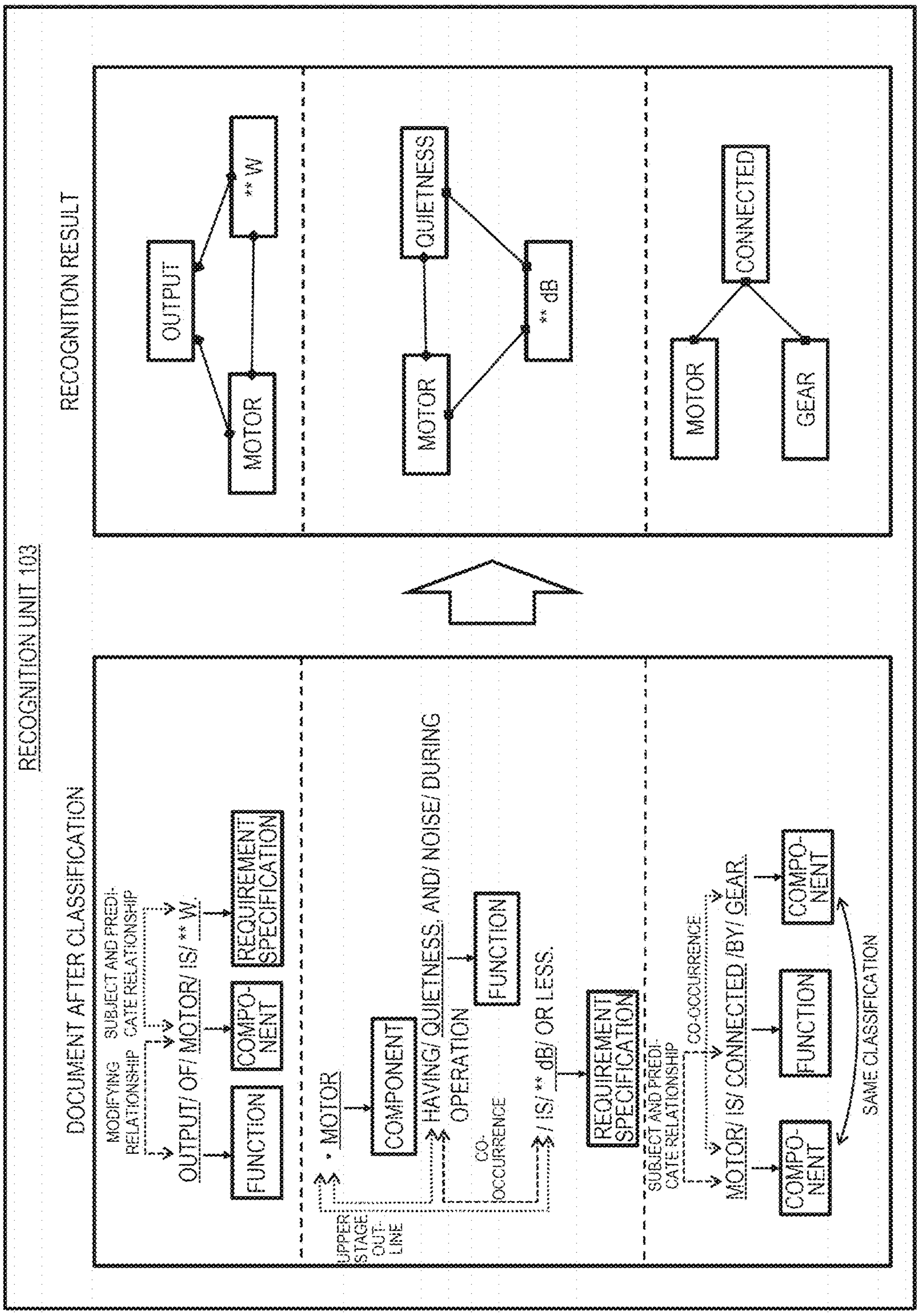
FIG. 5 is a diagram showing a processing procedure of a recognition unit.

FIG. 5 is a diagram showing a processing procedure of the recognition unit 103. The recognition unit 103 recognizes a relationship (to be immediately described later) between the phrase or a numerical value in the document in which the extraction unit 102 classifies the phrase or a numerical value. When the processing in FIGS. 6A and 6B to be described below ends, the recognition unit 103 generates a recognition result in FIG. 5.

Figure 6A:
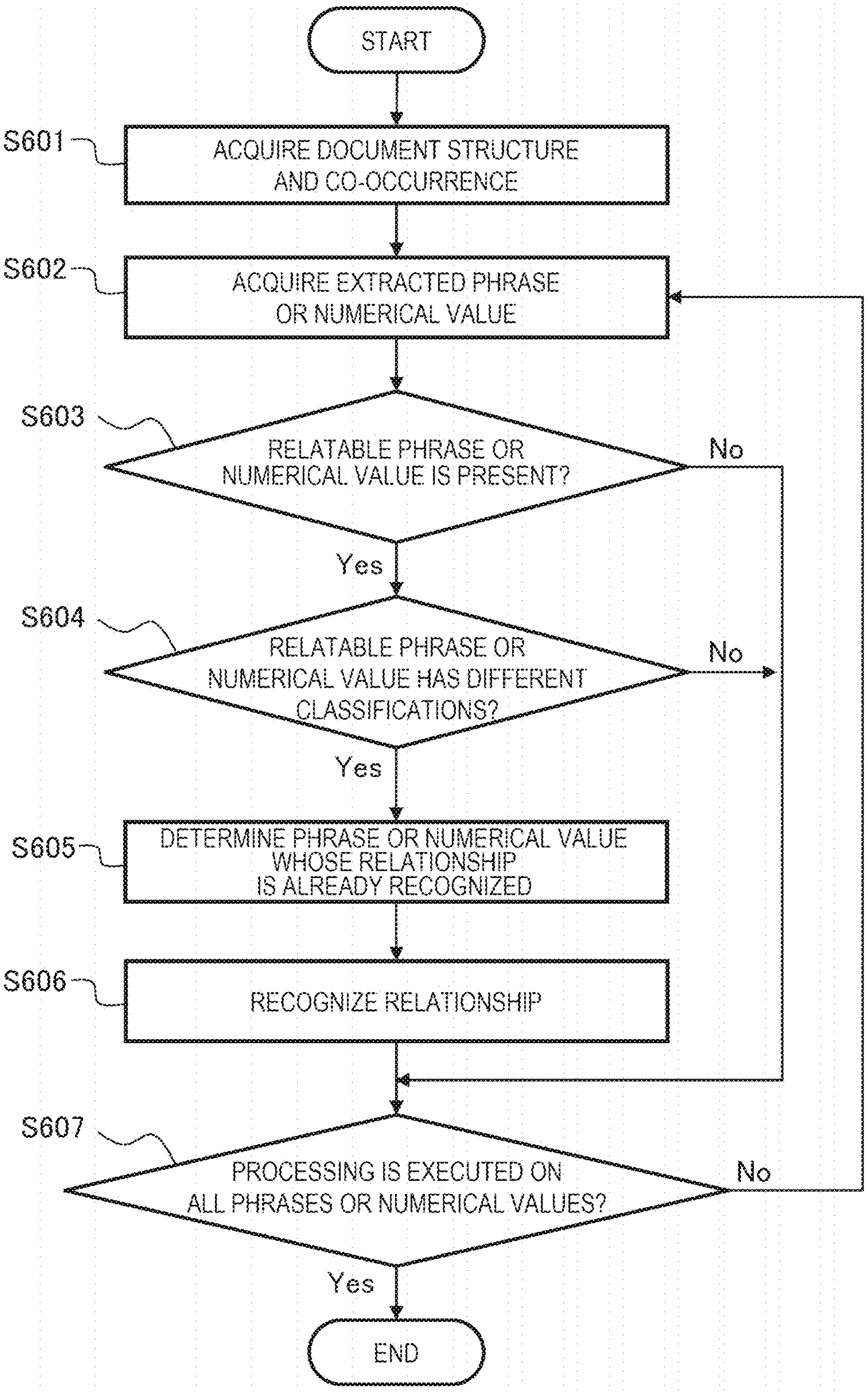
FIG. 6A is a flowchart of the recognition unit.

FIG. 6A is a flowchart of the recognition unit 103.

In step S601, the recognition unit 103 acquires the content structure of the document and the co-occurrence to grasp the relationship between the phrase or a numerical value appearing in the document included in the design information. Here, for example, the recognition unit 103 uses a technique of structural analysis for grasping a relationship between subjects and predicates in a field of natural language processing and recognizes the co-occurrence between a specific phrase or numerical value and a phrase or a numerical value frequently appearing accompanying the specific phrase or the numerical value.

In step S602, the recognition unit 103 acquires the phrase or a numerical value classified by the extraction unit 102 based on the classification axis. Here, the recognition unit 103 sequentially acquires the phrase or a numerical value appearing in the document included in the design information from the head of the document included in the design information.

In step S603, the recognition unit 103 determines whether a phrase or a numerical value that is relatable to the phrase or a numerical value acquired in step S602 is present. The recognition unit 103 uses the structure of the document and the co-occurrence acquired in step S601 to determine the presence or absence of the "relationship" here. The relatable phrase or numerical value is a phrase or a numerical value that has a dependency relationship and is obtained by the structural analysis, which is a technique in the field of natural used by the recognition unit 103, or phrase or a numerical value frequently co-occurring throughout the document. A criterion for determining whether there is a co-occurrence in the phrase or the numerical value is whether a frequency of appearance of each of the phrases or the numerical values in one sentence is high throughout the document. The recognition unit 103 may set a criterion for determining whether the frequency is high and may freely change a threshold thereof.

For example, when a phrase B (predicate) is present with respect to an acquired phrase A (subject), the recognition unit 103 determines that the "relatable phrase or a numerical value is present". A relationship between subjects and predicates is an example of the dependency relationship. Further, a relationship between modifiers and modified words is also an example of the dependency relationship. The recognition unit 103 proceeds to step S604 if the relatable phrase or numerical value is present ("Yes" in step S603), and proceeds to step S607 in other cases ("No" in step S603).

In step S604, the recognition unit 103 determines whether items (classifications) of the relatable phrase or a numerical value have classifications different from the items of the phrase or a numerical value acquired in step S602.

For example, as is clear from the bottom row in FIG. 5, when the acquired phrase "motor" is "component" and the relatable phrase "connected" is "function", the recognition unit 103 determines that the "motor" and the "connected" are different items (classifications). In contrast, when the acquired phrase "motor" is a "component" and the relatable phrase "gear" is also a "component", the recognition unit 103 determines that the "motor" and the "gear" are the same item (classification). The recognition unit 103 proceeds to step S605 if the classification is different ("Yes" in step S604), and proceeds to step S607 in other cases ("No" in step S604).

In step S605, the recognition unit 103 determines whether the relationship between the phrase or a numerical value acquired in step S602 has already been recognized in the previous processing, and acquires a result thereof.

In step S606, the recognition unit 103 recognizes a final relationship between the phrase or a numerical value acquired in step S602 and the relatable phrase or a numerical value. There is no need for the recognition unit 103 to recognize the relationship again for the numerical values and phrases determined to have a relationship recognized in step S605. As is clear from the bottom row in FIG. 5, the recognition unit 103 does not recognize a direct relationship between the "motor" and the "gear".

In step S607, the recognition unit 103 determines whether processing has been performed on all the phrases or numerical values. The recognition unit 103 ends processing related to the recognition of the relationship if the processing has been performed ("Yes" in step S607), and returns to step S602 in other cases ("No in step S607").

Figure 6B:
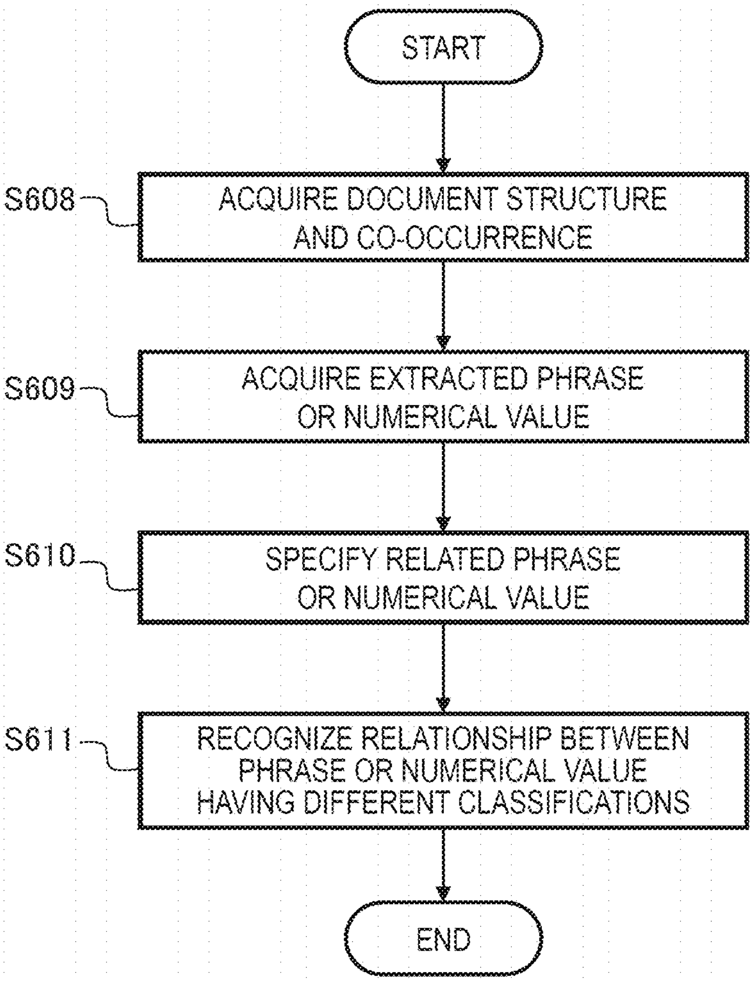
FIG. 6B is another flowchart of the recognition unit.

FIG. 6B is another flowchart of the recognition unit 103. In FIG. 6A, a relationship between the phrase or the numerical value is recognized for each of the phrases or the numerical values appearing in the design information. In contrast, in FIG. 6B, the recognition unit 103 recognizes relationships for all the phrases or numerical values included in the design information in one piece of processing. Accordingly, the processing time is shortened.

In step S608, similar to step S601 in FIG. 6A, the recognition unit 103 acquires the structure of the document and the co-occurrence of the phrase or a numerical value included in the design information.

In step S609, the recognition unit 103 acquires all the phrases or numerical values classified by the extraction unit 102 based on the classification axis.

In step S610, the recognition unit 103 specifies the related phrase or a numerical value based on the structure of the document and the co-occurrence of the phrase or a numerical value which are acquired in step S608 for all the phrase or a numerical value included in the design information received by the input unit 101.

In step S611, the recognition unit 103 recognizes a relationship between the phrase or the numerical value having different classifications among the related phrase or a numerical value specified in step S610.

The recognition unit 103 recognizes the relationships between the phrase or a numerical value related to the component, the function, or the requirement specification from the entire design information by repeatedly performing the processing. When the design information is structured and described, the recognition unit 103 recognizes a relationship between the phrase or the numerical value related to a component, a function, or a requirement specification included in a document in a lower stage of the outline (hierarchical structure). Then, the recognition unit 103 recognizes a relationship between the phrase or the numerical value related to a component, a function, or a requirement specification included in a document in an upper stage of the outline. Thereafter, the recognition unit 103 recognizes that there is a relationship between the phrase or a numerical value related to the component, the function, or the requirement specification included in the document in a lower stage and the phrase or a numerical value related to the component, the function, or the requirement specification included in the document in the upper stage (refer to the second row in FIG. 5). However, the recognition unit 103 does not execute the recognition of the relationship across the hierarchy on the phrase or a numerical value of the same classified item among items of the component, the function, or the requirement specification classified by the extraction unit 102.

Examples of a document in an upper stage and a document in a lower stage include a basic design and a detailed design, a collective paragraph and a specific example, a main text and an attached sheet, a main text and a footnote, and an answer and a plurality of questions from which the answer is obtained.

The association unit 104 associates the phrase or the numerical value which is related to the component, the function, or the requirement specification and is recognized to have a relationship by the recognition unit 103. For example, the association unit 104 may assign identification numbers to the phrase or a numerical value indicating the component, the function, or the requirement specification and extracted by the extraction unit 102, and may assign an identification number of a phrase or a numerical value of another item recognized to be related by the recognition unit 103 to the phrase or the numerical value. That is, the recognition unit 103 associates a certain phrase or a numerical value with the identification number of another phrase or numerical value which is the destination of the relationship.

To associate which document of the design information the relationship recognized by the recognition unit 103 is described, the association unit 104 may assign an identification number to each document of the design information acquired by the input unit 101 and may associate the identification number with each phrase and numerical value related to the corresponding component, function, and requirement specification.

There is no need for the association unit 104 to associate combinations of phrases recognized as having a relationship without omission. For example, the association unit 104 may count the number of times the phrase A and the phrase B co-occur in the same text (sentence) in the design information, and may not associate the phrase A with the phrase B when the number of times is less than a predetermined threshold. In another example, the association unit 104 may specify a feature word of the design information by a known method (tf-idf method or the like) and may associate only combinations including at least one feature word.

Figure 7:
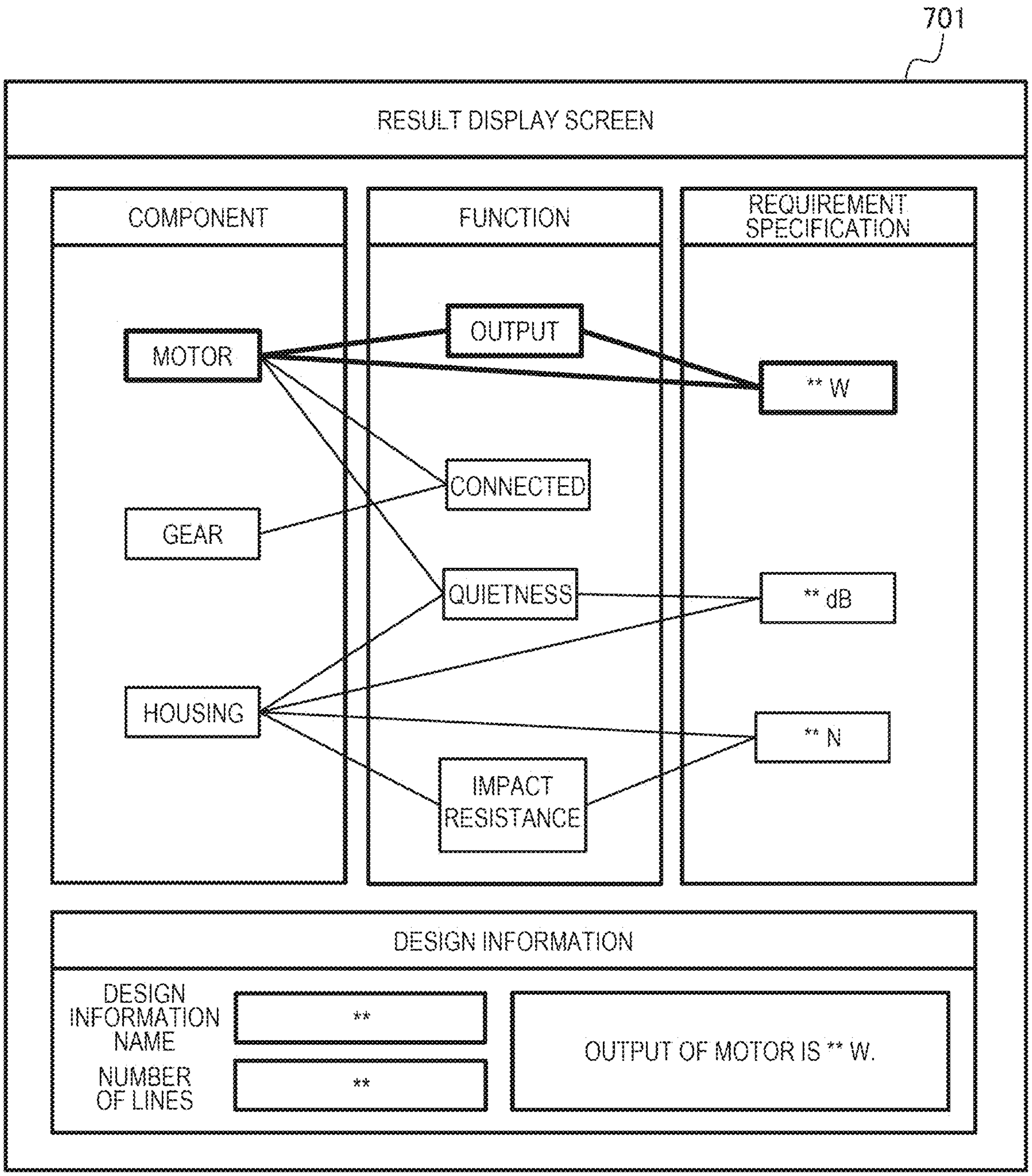
FIG. 7 is an example of a result display screen.

The output unit 105 displays a result obtained by the association unit 104 performing the processing (see FIG. 7).

FIG. 7 is an example of a result display screen 701. On the result display screen 701, the output unit 105 displays, for each item, the phrase or the numerical value that corresponds to each item of the component, the function, or the requirement specification and is extracted by the extraction unit 102, and displays the relationships associated by the association unit 104 by lines connecting the phrase or a numerical value.

The output unit 105 also displays that the displayed relationships between the phrase or a numerical value related to the component, the function, or the requirement specification are described in which design document. For example, in the example shown in FIG. 7, when the user selects a line indicating a relationship with "motor", "output", and " W", the output unit 105 displays a design information name "", the number of lines "", and the document of "output of motor is represented by  W" in a "design information" field at the bottom of the result display screen 701. In addition to displaying the results, the output unit 105 may use the results obtained by the association to output an MBSE model that indicates the relationship between the phrase or a numerical value related to the component, the function, or the requirement specification.

Second Embodiment

The design support apparatus 100 according to a second embodiment has a function of updating the classification axis storage unit D001 by inputting an MBSE model in addition to the function of the design support apparatus 100 according to the first embodiment.

Figure 8A:
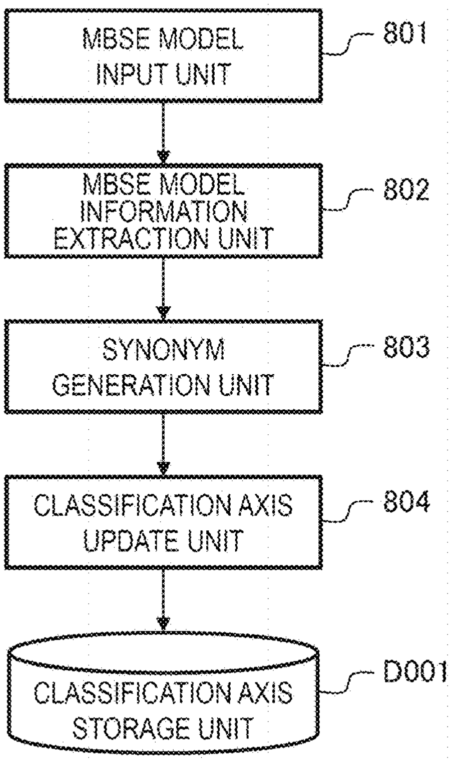
FIG. 8A is a block diagram showing a design support apparatus according to a second embodiment.

FIG. 8A is a block diagram of the design support apparatus 100 according to the second embodiment. The design support apparatus 100 in FIG. 8A includes an MBSE model input unit 801, an MBSE model information extraction unit 802, a synonym generation unit 803, a classification axis update unit 804, and the classification axis storage unit D001.

The MBSE model input unit 801 acquires a file describing the MBSE model from any device including an external device. The file describing the MBSE model is described in a modeling language such as a systems modeling language (SysML). Types of the MBSE model include a block definition diagram illustrating only components, a functional block diagram illustrating only functions, and a request diagram illustrating only requirement specifications. That is, each MBSE model includes only one item of the component, the function, or the requirement specification.

The MBSE model information extraction unit 802 performs extraction from the information described in the modeling language. That is, the MBSE model information extraction unit 802 extracts a phrase and numerical value describing the component from the block definition diagram, a phrase and numerical value describing a function from the function block diagram, and a phrase and numerical value describing the requirement specification from the request diagram.

The synonym generation unit 803 generates synonyms of the phrase or a numerical value for the phrase or a numerical value extracted by the MBSE model information extraction unit 802. The synonym generation unit 803 generates the synonyms by using a database learned in advance. The synonym refers to another phrase and numerical value having the same meaning as the original phrase and numerical value. For example, in the component, the "electric motor" is a synonym of the "motor". In the function, "propulsion" is a synonym of "drive". In the requirement specification, " horsepower" is a synonym of converted " W". This also applies to a case in which the extraction unit 102 described above generates synonyms.

The classification axis update unit 804 updates the classification axis by storing the phrase and numerical value acquired from the MBSE model and the generated synonyms in the classification axis storage unit D001 as the classification axis.

Figure 8B:
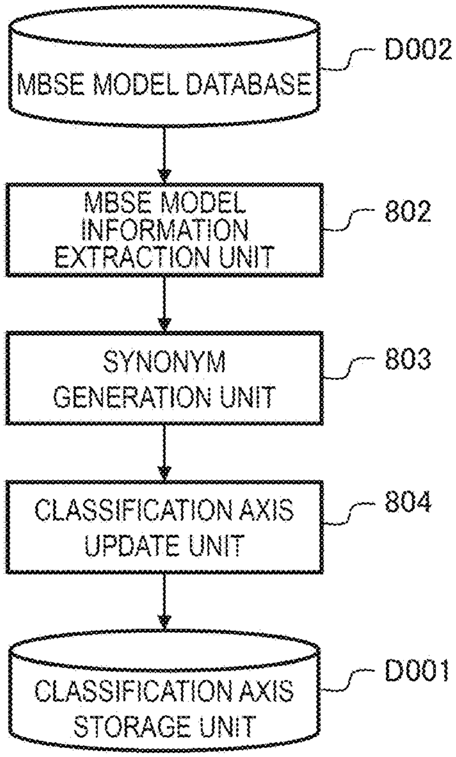
FIG. 8B is another block diagram showing the design support apparatus according to the second embodiment.

FIG. 8B is another block diagram of the design support apparatus 100 according to the second embodiment. A configuration of the design support apparatus 100 in FIG. 8B is obtained by changing the MBSE model input unit 801 to an MBSE model database D002 in the configuration shown in FIG. 8A. The MBSE model database D002 stores an MBSE model of events in the past related to the target product. The MBSE model database D002 updates the classification axis storage unit D001 by sending the MBSE model of events in the past from itself to the MBSE model information extraction unit 802.

Figure 9:
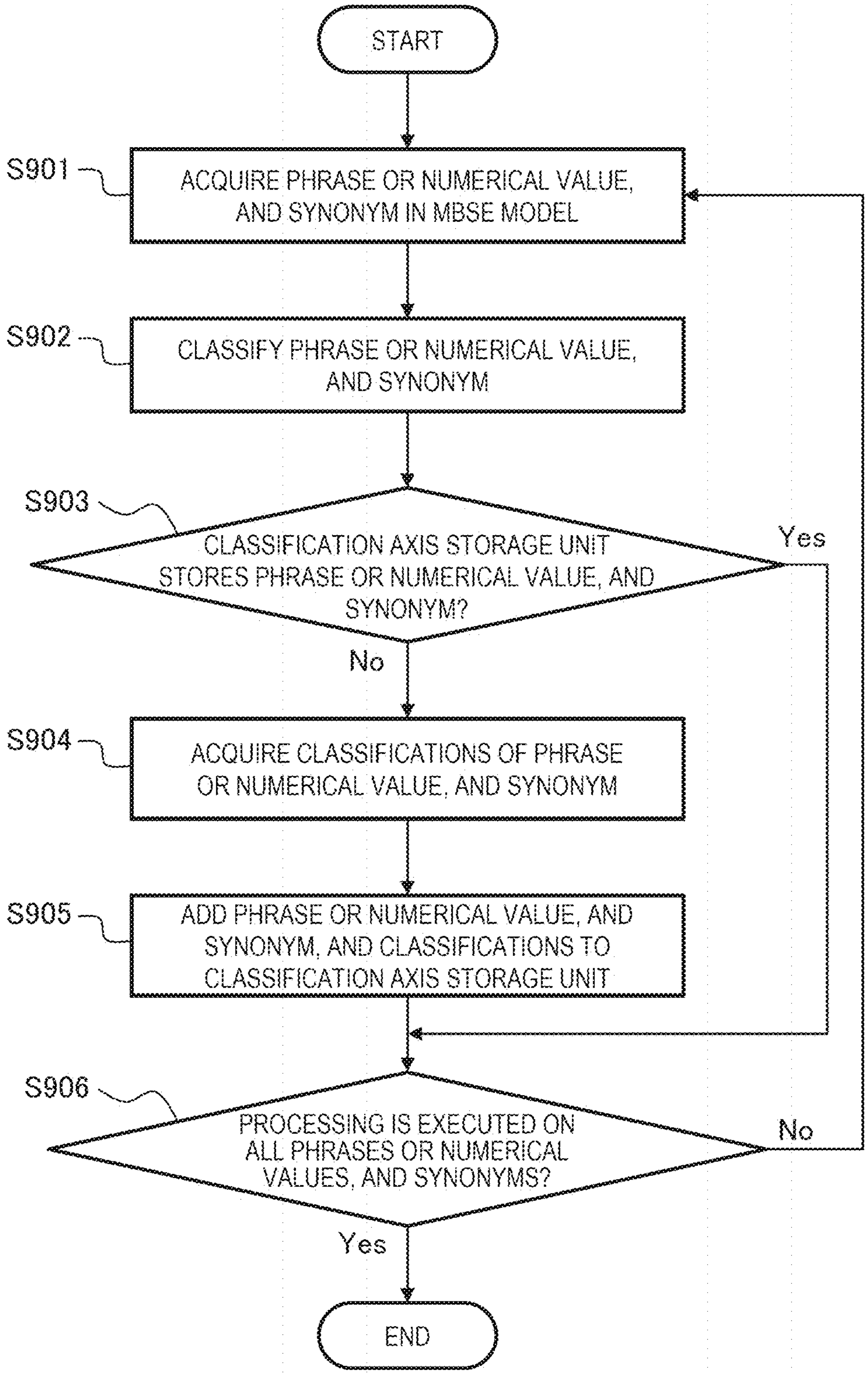
FIG. 9 is a flowchart of a classification axis update unit.

FIG. 9 is a flowchart of the classification axis update unit 804.

In step S901, the classification axis update unit 804 acquires the phrase or a numerical value acquired from the MBSE model information extraction unit 802 and the synonyms generated by the synonym generation unit 803. The synonym acquired here may be a phrase or a numerical value.

In step S902, the classification axis update unit 804 classifies the phrases, the numerical values, and the synonyms acquired in step S901 into which of the component, the function, or the requirement specification. The classification axis update unit 804 performs the classification based on the type of the input MBSE model.

In step S903, the classification axis update unit 804 determines whether the classified phrases, numerical values, and synonyms are already stored in the classification axis storage unit D001 as the classification axis. The classification axis update unit 804 proceeds to step S906 if the storage is performed ("Yes" in step S903), and proceeds to step S904 in other cases ("No" in step S903).

In step S904, the classification axis update unit 804 acquires classifications of the phrases, the numerical values, and the synonyms classified in step S902.

In step S905, the classification axis update unit 804 stores (adds) the phrases, the numerical values, and the synonyms in the classification axis storage unit D001 in association with the classifications (items).

In step S906, the classification axis update unit 804 determines whether processing is executed on all of the phrases or numerical values included in the input MBSE model and the generated synonyms. The classification axis update unit 804 ends the processing when the processing is executed ("Yes" in step S906), and returns to step S901 in other cases ("No" in step S906).

The classification axis update unit 804 updates the classification axis using the input MBSE model by the processing described above and classifies the phrase or a numerical value more accurately in the design information.

Effects of the design support apparatus according to the present embodiment are as follows.

(1) The design support apparatus can visualize the relationship between the component, the function, or the requirement specification.

(2) The design support apparatus can generate synonyms of the phrase or a numerical value from an existing model described in the modeling language.

(3) The design support apparatus can classify the phrase or a numerical value more accurately by the morphological analysis.

(4) The design support apparatus can recognize only a truly necessary relationship.

(5) The design support apparatus can be applied to hierarchical design information.

(6) The design support apparatus can output a relationship between the phrase or a numerical value by a model.

(7) The design support apparatus can extract a synonym of a phrase or a numerical value designated in advance by the classification axis.

(8) The design support apparatus can recognize all relationships included in the design document in one piece of processing (increase in processing speed).

The invention is not limited to the embodiments described above and includes various modifications. For example, the embodiment described above has been described in detail to facilitate understanding of the invention, and the invention is not necessarily limited to those including all the configurations described above. A part of a configuration according to one embodiment can be replaced with a configuration according to another embodiment, and a configuration according to another embodiment can also be added to a configuration according to one embodiment. A part of a configuration in each embodiment may be added to, deleted from, or replaced with another configuration.

A part or all of the configurations, functions, processing units, processing methods, and the like described above may be implemented by hardware by, for example, designing with an integrated circuit. In addition, the configurations, functions, and the like described above may be implemented by software by a processor interpreting and executing a program for implementing each function. Information such as a program, a table, and a file for implementing each function can be stored in a recording device such as a memory, a hard disk, and a solid state drive (SSD), or in a recording medium such as an IC card, an SD card, and a DVD.

Further, control lines and information lines are those considered to be necessary for description, and not all the control lines and information lines are necessarily shown in the product. Actually, it may be considered that almost all the configurations are connected to one another. Various types of information of the design support apparatus 100 may exist in a cloud.

What is claimed is:

1. A design support apparatus comprising:

an input unit configured to acquire design information related to a target product;

an extraction unit configured to extract, based on a classification axis that is a rule for classifying a phrase or a numerical value related to a component, a function, or a requirement specification in the target product and that is stored in a classification axis storage unit configured to store the classification axis, the phrase or the numerical value related to the component, the function, or the requirement specification from the design information;

a recognition unit configured to recognize a relationship between the extracted phrases or between the extracted numerical values related to the component, the function, or the requirement specification based on a content structure of the design information and a co-occurrence;

an association unit configured to associate the relationship between the phrases or between the numerical values; and an output unit configured to output a result of the association executed by the association unit.

2. The design support apparatus according to claim 1, further comprising:

a synonym generation unit configured to generate, based on a model configured to describe the phrase or the numerical value related to the component, the function, or the requirement specification in the target product, a synonym of the phrase or the numerical value related to the component, the function, or the requirement specification described in the model; and a classification axis update unit configured to update the classification axis storage unit by storing the phrase or the numerical value related to the component, the function, or the requirement specification, and the generated synonym in the classification axis storage unit as the classification axis.

3. The design support apparatus according to claim 1, wherein the extraction unit performs a morphological analysis of natural language processing, and classifies a phrase or a numerical value obtained as a result of disassembling a document described in the design information into words based on the classification axis stored in the classification axis storage unit.

4. The design support apparatus according to claim 1, wherein the recognition unit recognizes a phrase or a numerical value that is relatable to the phrase or the numerical value based on a dependency relationship and a co-occurrence of a phrase and a numerical value in a document included in the design information, and recognizes a relationship between the phrases or between the numerical values extracted by the extraction unit and the relatable phrase or numerical value only when a classification of the phrase or the numerical value extracted by the extraction unit is different from a classification of the relatable phrase or numerical value.

5. The design support apparatus according to claim 1, wherein the recognition unit recognizes a relationship between a phrase or a numerical value located in an upper stage in a hierarchy and a phrase or a numerical value located in a lower stage in the hierarchy when the design information is a structured document.

6. The design support apparatus according to claim 1, wherein the output unit outputs a model that indicates the phrase or the numerical value related to the component, the function, or the requirement specification, and indicates the relationship between the phrases or between the numerical values.

7. The design support apparatus according to claim 1, wherein the extraction unit generates a synonym related to the classification axis and extracts the phrase or the numerical value related to the component, the function, or the requirement specification together with the generated synonym.

8. The design support apparatus according to claim 1, wherein the recognition unit recognizes relationships between all phrases and numerical values included in the design information in one piece of processing.

9. A design support method comprising:

acquiring, by an input unit of a design support apparatus, design information related to a target product;

extracting, by an extraction unit of the design support apparatus, based on a classification axis that is a rule for classifying a phrase or a numerical value related to a component, a function, or a requirement specification in the target product and that is stored in a classification axis storage unit configured to store the classification axis, the phrase or the numerical value related to the component, the function, or the requirement specification from the design information;

recognizing, by a recognition unit of the design support apparatus, a relationship between the extracted phrases or between the extracted numerical values related to the component, the function, or the requirement specification based on a content structure of the design information and a co-occurrence;

associating, by an association unit of the design support apparatus, the relationship between the phrases and between the numerical values; and outputting, by an output unit of the design support apparatus, a result of the association executed by the association unit.

* * * * *